UNITED STATES PATENT OFFICE.

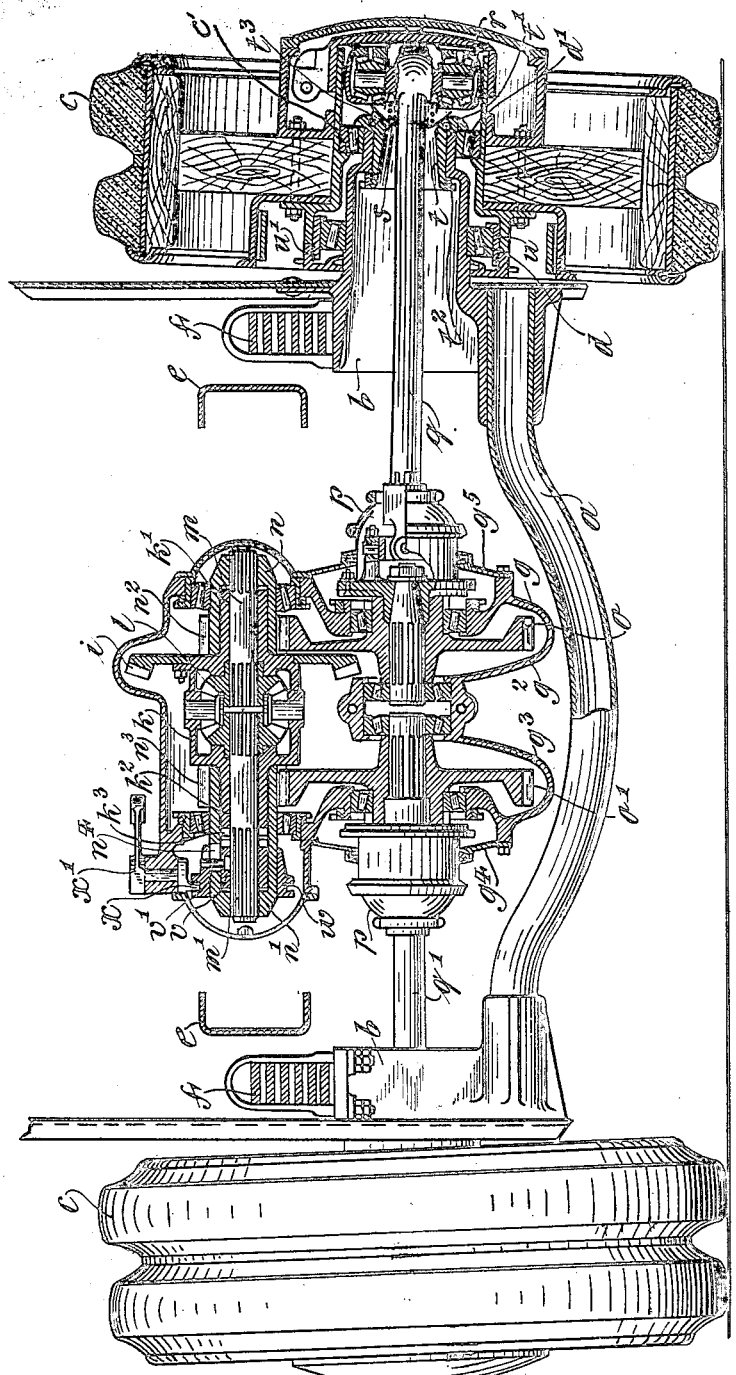

ALEXANDER LUCAND, OF NEW YORK, N. Y., ASSIGNOR TO INTERNATIONAL MOTOR COMPANY, OF NEW YORK, N. Y., A CORPORATION OF DELAWARE.

REAR-AXLE DRIVE.

1,379,770.

Specification of Letters Patent. Patented May 31, 1921.

Application filed June 25, 1919. Serial No. 306,678.

*To all whom it may concern:*

Be it known that I, ALEXANDER LUCAND, a citizen of the United States, residing in the borough of Manhattan of the city of New York, in the State of New York, have invented certain new and useful Improvements in Rear-Axle Drives, of which the following is a specification, reference being had to the accompanying drawing, forming a part hereof.

This invention relates to an improved rear axle double reduction drive adapted particularly for use in motor trucks. The invention has for its principal object to incorporate in a rear axle drive a double reduction between the transmission and the wheel which shall be effected in such a manner that the wheels will not be so free as is the case where the live axle sections are driven directly from the differential. It is usual in motor power practice to effect all reduction in speed up to the differential shafts, so that these shafts are relatively free and even permit one of the wheels to spin, particularly in starting and slowing down or where the conditions of load and road impress unequal resistances on the two axle sections. Such an effect reduces the effective driving effort and results in undue wear on the tires. In accordance with the present invention the last reduction is accomplished at a point between the differential and the wheels so that the live axle sections are not as free as heretofore and the tendency is for an effective driving effort to be transmitted by each of the axle sections under usual conditions.

A further object of the invention is to associate with a drive of the type described a simple locking device for the differential whereby equal driving effort is impressed on both of the live axle sections as is desirable in starting under unusual conditions where the road surface does not afford adequate or equal frictional resistance to both of the drive wheels.

Still another object of the invention is to provide a rear axle double reduction drive which may be directly associated with a selective type of transmission and permit the transmission and the reduction drive to be mounted compactly within a single case supported on the vehicle frame. By such construction the wheels are of the full floating type connected by comparatively light dead axles. The case employed to support the improved unit insures easy lubrication of all of the moving parts therein and the live axle sections are so connected to the wheels as to permit easy lubrication of the parts within the hubs of the wheels. The connections of the live axle sections with the wheels are of such a type that relatively long shafts may be employed thereby reducing materially the angular movement of the shafts at their universal joints and the wear on the latter.

These and other objects of the invention will appear in greater detail hereinafter in connection with the description of the illustrated embodiment in the drawing, which shows partly in transverse section and partly in end elevation of a pair of wheels with which is associated the improved drive.

The tubular dead axle $a$ carries at its ends tubular wheel supports $b$ on which are journaled the wheels $c$, as through bearings $d$, $d'$, the races of which are mounted on the wheel supports $b$. The frame $e$ of the vehicle is supported in the usual manner by the vehicle springs $f$ which are seated on the wheel supports $b$. The casing $g$ for the transmission and for the improved drive, which will be described hereinafter, may be supported on the vehicle frame in any suitable manner. The driving effort through the transmission is communicated through the usual bevel pinion (not shown) to a master gear $i$ carried by a differential box $k$ in which is supported a differential gear of suitable type, indicated generally at $l$. The differential box $k$ is provided on its opposite side walls with alined sleeves $k'$, $k^2$ through which extend loosely the differential stub shafts $m$, $m'$. These stub shafts $m$, $m'$ are keyed adjacent their outer ends to the hubs $n$, $n'$ of spur gears $n^2$, $n^3$, respectively. The sleeves $k'$, $k^2$ of the differential box $k$ bear within the hubs $n$, $n'$, respectively, of the spur gears $n^2$, $n^3$. With the spur gears $n^2$, $n^3$ are meshed spur gears $o$, $o'$, respectively, journaled in the casing $g$ and connected through suitable universal joints $p$ to live axle sections $q$, $q'$, respectively, which are operatively connected with the wheels $c$. Referring to the live axle section $q$, it will be seen that this shaft extends through the tubular wheel support $b$ to a point adjacent the outer end of the hub of the right hand wheel $c$ and is engaged with the hub through a spider $r$ which permits angular movement of the shaft with relation to the hub. The interior of the wheel hub may be closed against leakage of lubricating oil therein and against the entry of foreign substances by means of a spring-pressed cap $s$ which engages the shaft $q$ snugly and is pressed against the end of the wheel support $b$. Within the end of the wheel support $b$ may be mounted a thimble $t$ which has an annular flange $t'$ adapted to engage one of the wheel bearings $d'$ and hold this bearing against an annular shoulder $c'$ formed on the interior of the wheel hub. The thimble $t$ is locked in place by a suitable locking ring $t^2$. The closing cap $s$ may bear against the thimble $t$ and this thimble may, in addition, carry an annular packing washer $t^3$ to insure a tight closure.

The other wheel bearing $d$ may be mounted in a ring $u$ which is supported within the hub of the wheel and may be threaded to engage a locking ring $u'$ by which the bearing $d$ may be adjusted on the wheel support $b$.

Referring now again to the construction of the differential box $k$ and its associated parts, the sleeve $k^2$ of the box is formed at its end with teeth $k^3$ adapted to be engaged by a slidable jaw clutch $v$ feathered on the differential stub shaft $m'$. This jaw clutch $v$ is provided with a pin $v'$ which extends through a slot $n^4$ formed on the hub $n'$ of the spur gear $n^3$ and the exposed end of the pin is engaged operatively by a sleeve $w$ mounted slidably on the exterior of the hub $n'$ and, in turn, engaged by an arm $x$ of an operating eccentric $x'$ which may be actuated by the driver to slide the sleeve $w$ as desired.

From the description given, it appears that when the differential $l$ functions in its intended manner the first reduction of speed is obtained through the engagement of the bevel pinion with the master gear $i$ on the differential box. The second reduction is obtained between the spur gears $n^2$, $n^3$ and $o$, $o'$, respectively. By interposing this second reduction between the live axles $q$, $q'$ and the differential instead of having the differential shafts $m$, $m'$ drive the live axle sections by direct connection, as is usual, the wheels are not as free as is ordinarily the case and the tendency of one of them to spin where different resistances are offered to the two, is considerably reduced. Where the road conditions are such that the wheels have comparatively little grip, it is desirable to lock the driving devices so that equal driving effort is applied to both wheels. This locking is accomplished in the improved construction by operating the eccentric $x'$ so as to move the jaw clutch $v$ into operative engagement with the teeth $k^3$ of the differential box $k$. With the jaw clutch in this position the box is locked to the shaft $m'$ and differential movement between the shafts $m$, $m'$ is thereby prevented. The construction is simple and effective.

The manner of mounting the wheels $c$ on the dead axle $a$ offers important advantages since it permits the wheel bearings $d$, $d'$ to be readily adjustable and the lubricating oil for the parts inclosed within the hub to be retained conveniently therein. Further, the construction permits a long live axle section $q$ to be employed since this axle section extends to the outer end of the wheel hub. Such length reduces correspondingly the angular movement of this shaft and the consequent wear on the universal joints thereof.

The casing $g$ which incloses the transmission and the drive may have its bottom wall of trough-like form, as indicated at $g^2$, $g^3$ adjacent the section where the large spur gears $o$, $o'$ are mounted, thereby insuring adequate lubrication of these gears and of all of the associated parts. Detachable cover plates $g^4$, $g^5$ may be secured to the opposite side walls of the casing $g$ to facilitate assembling and disassembling of the parts within the casing and their inspection and adjustment.

The scope of the invention will appear from the accompanying claim.

I claim as my invention:

In a rear axle drive for motor vehicles, a differential gear including differential stub shafts, a housing for the gear having sleeves through which said stub shafts extend, gears journaled on the sleeves and provided with hubs in driving engagement with the shafts, a jaw clutch feathered on one of the stub shafts and engageable with the housing of the differential, a pin carried by said clutch and extending through and above the adjacent gear hub, a sleeve mounted slidably on said hub and adapted to engage the pin, and slide the clutch to lock the housing to the last named stub shaft.

ALEXANDER LUCAND.